United States Patent [19]

Norris

[11] Patent Number: 5,238,881

[45] Date of Patent: Aug. 24, 1993

[54] STABLE COLOR DISPERSIONS, THEIR PREPARATION AND USE IN CERAMIC GLAZES

[75] Inventor: Jeffrey J. Norris, Hudson, Ohio

[73] Assignee: Engelhard Corporation, Iselin, N.J.

[21] Appl. No.: 269,634

[22] Filed: Nov. 9, 1988

[51] Int. Cl.$^5$ .............................................. C03C 1/04
[52] U.S. Cl. .................................... 501/20; 106/312; 106/483; 106/486; 427/376.2
[58] Field of Search ............... 106/483, 401, 486, 468, 106/312; 501/20; 427/376.1, 376.2

[56] References Cited

U.S. PATENT DOCUMENTS

| | | | |
|---|---|---|---|
| 2,057,958 | 10/1936 | Jesson | 106/20 |
| 2,686,131 | 8/1952 | Combs | 106/172 X |
| 3,443,973 | 5/1969 | Bugosh et al. | |
| 3,453,131 | 7/1969 | Fadner | |
| 3,458,325 | 7/1969 | Zola | 501/20 X |
| 3,725,089 | 4/1973 | Zola | 501/20 X |
| 3,834,924 | 9/1974 | Grillo | |
| 3,868,334 | 2/1975 | Van Loan | |
| 3,871,890 | 3/1975 | Eppler | 501/20 |
| 4,267,065 | 5/1981 | Johnson, Jr. et al. | |
| 4,273,822 | 6/1981 | Bube | |
| 4,331,768 | 5/1982 | Boyd et al. | 501/17 X |
| 4,618,374 | 10/1986 | Thompson, III et al. | 106/288 B |
| 4,619,705 | 10/1986 | Dixon et al. | 106/288 B |

OTHER PUBLICATIONS

Odom, "Smectite Clay Minerals: Properties and Uses", Philosophical Transactions of the Royal Society of London, vol. 311, pp. 219–432, No. 1517 (1984).
Millot, "Clay", Scientific American 240(4) 108 (Apr. 1979).
*Applied Clay Minerology*, Ralph E. Grim, McGraw-Hill Book Co., Inc. New York, 1962, p. 377.

*Primary Examiner*—Karl Group

[57] ABSTRACT

A colored ceramic glaze is prepared from a raw glaze containing glass frit, clay and one or more ceramic pigments added as an aqueous dispersion. The raw glaze is ball-milled after which it is blended with the aqueous dispersion. The dispersion contains up to 70% of a ceramic pigment, such as zirconium-vanadium yellow, preferably with 1% to 3% of a suspending agent, up to about 1.5% of a thickener, an effective amount, but no more than 1% of a dispersant, and a biocide as needed. The suspending agent preferably is attapulgite clay or a water-swellable smectite clay. The thickener is preferably a xanthan gum and the dispersant is typically an ammonium salt of a medium molecular weight polymethacrylic acid. A stronger, more intense color is achieved by adding the ceramic pigment as a dispersion as opposed to ball-milling it with the glass frit as has been the traditional approach.

34 Claims, No Drawings

STABLE COLOR DISPERSIONS, THEIR PREPARATION AND USE IN CERAMIC GLAZES

FIELD OF THE INVENTION

This invention relates to glaze stains and body stains used to produce colored ceramic glazes. The invention also relates to a novel procedure for blending inorganic pigments with glass frit to make stains useful for decorative ceramic applications. In addition, the invention relates to one or more inorganic ceramic pigments in the form of an aqueous dispersion that can be added directly to a glass frit after the frit has been ball-milled.

BACKGROUND OF THE INVENTION

Ceramic glazes have normally been prepared by ball-milling together a glass frit, a clay and an inorganic pigment along with other components typically found in a raw glaze mix followed by dispersing the ball-milled product in water and spraying the dispersion on to a refractory substrate. The substrate is then fired to a temperature sufficient to melt the raw glaze. The molten glaze flows over and iniformly covers the surface of the substrate, totally surrounding and fusing the pigment to the surface. Upon cooling, the surface is covered with a hard glaze that is durable, washable and chemically inert in addition to being attractive in appearance.

This prior art procedure of ball-milling a frit and pigment has several serious drawbacks. The color intensity of inorganic pigments is dependent at least partially on the particle size of the pigments. For most high temperature pigments used to color ceramic stains, the color value is strongest when the particle size is in the 3 to 4 mu (microns) range or possibly larger. Typically, however, when the pigment is milled with the glaze composition, the pigment passes through the optimum range, eventually reaching a particle size of 2 mu or smaller. At this size, the color intensity is noticeably weaker than it is in the 3-4 mu range due to attack by the molten glaze during firing.

At intervals, while ball-milling, the glaze is tested for color and shade, and adjustments are made in the composition, often resulting in the addition of more of the same pigment, or the use of an entirely different pigment. Each addition requires several additional hours on the ball mill and results in potentially even greater particle size reduction.

When the pigmented glaze is removed from the ball mill, the mill must be thoroughly cleaned before a color change to prevent color contamination from one batch to the next.

If the manufacturer attempts to minimize the amount of particle size reduction of the pigment by adding the pigment near the end of the ball-milling, the resultant glaze often appears mottled due to inadequate wetting of the pigment by the aqueous raw glaze.

U.S. Pat. No. 2,057,958 describes one method of preparing a vitreous enamel slip using a titanium dioxide pigment. The pigment is prepared as a floc or a gel and is washed to remove soluble salts. It is added as an aqueous slurry to a ball mill along with a glass frit, a small amount of an adhesive such as gum tragacanth and from 0 to 3% clay. If a colored enamel is desired, a coloring agent is added to the mill. The basic problems discussed previously, namely the ball-milling of the pigment with the lack of control over the color intensity is manifest because of the intensive ball-milling.

U.S. Pat. No. 2,607,701 relates to glass colors adapted to be applied to a substrate by stencilling. The colors are composed of an inorganic pigment and a glass frit in a vehicle composed of 20 to 98% of a wax having a melting point between 120° F. and 212° F., 2 to 15% of ethyl cellulose as a viscosity pormoter and hardening agent, 0 to 55% of a resin or its derivative useful as a hardener, and a binder to dissolve the wax. Lecithin or phosphorated tall oil is present in an amount of 0 to 20% as a dispersion control agent. The vehicle is used in an amount of 1 part to 1–4 parts of the glass color. After the glass color is applied to the substrate, the glass is fused by firing.

U.S. Pat. No. 3,443,973 describes a method of producing vitreous enamel powders by preparing an aqueous slurry of a borosilicate frit having a pH of at least 8, preparing an aqueous slurry of a refractory inorganic pigment having a pH of at least 8, preparing an aqueous slurry of a refractory inorganic pigment having a pH no higher than 5, mixing the two slurries to provide from 3 to 20 parts of pigment per 100 parts of frit to cause agglomeration of the frit and pigment particles, drying and heating the particles to form a loosely bonded cake and breaking up the cake to form individual frit-pigment particles.

U.S. Pat. No. 3,868,334 discloses a glass composition for firing into a resistant glaze and comprising an admixture of a borosilicate glass frit, a conductive metal oxide such a ruthenium dioxide, and a binder composed of ethyl cellulose in butyl carbitol.

U.S. Pat. No. 4,331,768 describes a method of forming a smooth, matte glaze on a ceramic substrate comprising forming a base frit and preparing a slurry of the frit plus 4–8% of $SnO_2$ and 4–8% of $TiO_2$, said frit optimally containing up to 5% of an organic binder such as sugar and up to 5% of clay. The slurry is then applied to the substrate whereupon the substrate is fired at a temperature of 975°–1075° C.

BRIEF DESCRIPTION OF THE INVENTION

This invention includes a process of making a colored ceramic slip, the preparation of a stable aqueous dispersion of one or more inorganic refractory pigment for use in said ceramic slip, the preparation of a decorative ceramic surface, and the resultant product obtained thereby.

Among the objects and advantages of the present invention are the following:

(1) It eliminates the necessity of ball-milling a refractory inorganic pigment with a raw glaze composition. Since most such pigments have an optimum color intensity in a particular range of particle sizes, ball-milling often results in a particle size reduction below this range, thereby resulting in a loss of color intensity.

(2) Because the pigment is not ball-milled, stronger color intensity can be achieved thereby optimizing the amount of pigment being used.

(3) Because pigments are not introduced into the ball-mill, the time and energy devoted to clean-up of the ball-mill are kept to a minimum.

(4) Color changes can be made to the ceramic slip simply and effectively without the necessity of adding more pigments to the ball mill, milling, withdrawing samples and making additional time-consuming tests and adjustments to achieve the right color matches.

Thus, the entire ball-milling procedure is expedited, and the process of color matching is greatly simplified.

(5) It allows for the formation of stable dispersions of high-density ceramic pigments having specific gravities between 4 and 6 whereas, heretofore, the preparation of color dispersions has been limited to organic and inorganic pigments having a specific gravity less than 4.

These and other objects and advantages are achieved by preparing an aqueous color dispersion for use in a ceramic glaze, said dispersion having the following composition by weight:

(a) between about 20 to about 70%, preferably about 60 to about 65% of one or more inorganic ceramic or refractory pigments;

(b) between about 1% and about 3% of a water-swellable clay as a suspending agent for the pigment;

(c) from zero up to about 1.5% of a thickening agent;

(d) from zero up to about 1% of an organic dispersing agent; and (e) the remainder being water.

The refractory pigment is capable of being heated to firing temperatures with minimal degradation. Typically, such temperatures are in the range of 1000° C. to 1300° C.

The invention includes the method of making a ceramic slip adapted to be sprayed, screened or otherwise applied to a refractory surface, said method comprising the steps of:

(a) preparing a stable aqueous dispersion of one or more inorganic ceramic pigments, said dispersion containing between about 20 and about 70% by weight of the pigment, between about 1% and about 3% by weight of a water-swellable clay, from zero up to about 1.5% of a thickening agent, and from zero up to about 1% of an organic dispersing agent, the remainder being water;

(b) preparing a raw glaze in the particle size range that will permit the glaze to be applied to a refractory surface by spraying, dipping or screening, and (c) blending an adequate amount of the pigment dispersion or dispersions (typically between 0.1 and 20% by weight), with between 99.9% and 80% of the raw glaze to impart the desired color to the glaze.

The method produces a ceramic glaze which, before firing contains an effective amount of the inorganic color dispersion as prepared aforesaid, added to a raw ball-milled glaze composition.

DETAILED DESCRIPTION OF THE INVENTION

This invention relates generally to the field of ceramic glazes, and more particularly to the use of stable dispersions of inorganic ceramic stains in glazes for adding color and appeal to refractory bodies useful for artware, dinnerware, tile and sanitary ware.

For purposes of clarity, the following terms shall be defined as follows:

Glaze stains refer to ceramic colors (pigments) of relatively high specific gravity such as from about 4 or 4.5 to about 6 or 6.5 which are capable of being heated to high temperatures, from about 1000° C. and preferably up to 1300° C. without degradation. These colors typically are inorganic mixed metal oxides of the type shown in Table I.

TABLE I

| Composition | Color | Crystalline Structure | Color Index No. |
|---|---|---|---|
| Zirconium vanadium | Yellow | Baddeleyite | 77991 |
| Chrome Alumina | Pink | Corundum-hematite | 77003 |
| Manganese Alumina | Pink | " | 77005 |
| Chromium (with modifiers) | Green Black | " | 77288 |
| Iron (w/modifiers) | Brown | " | 77491 |
| Oxides of Calcium, Chromium & Silicon | Green | Garnet | 77300 |
| Cobalt Silicate | Blue | Olivine | 77364 |
| Cobalt Nickel | Gray | Periclase | 77332 |
| Cobalt Zinc Silicate | Blue | Phenacite | 77366 |
| Lead Antimonate | Yellow | Pyrochlore | 77588 |
| Tin Vanadium | Yellow | Rutile-casseterite | 77862 |
| Chrome Tin | Red | " | 77863 |
| Nickel Antimony | Yellos | " | 77788 |
| Nickel Niobium Titanium | Yellow | " | 77895 |
| Chrome Antimony Titanium | Buff | Rutile-casseterite | 77310 |
| Chrome Niobium Titanium | Yellow | " | 77896 |
| Chrome Tungsten Titanium | Yellow | " | 77897 |
| Manganese Antimony Titanium | Yellow | Rutile-casseterite | 77899 |
| Titanium Vanadium Antimony | Gray | " | 77898 |
| Tin Antimony | Gray | " | 77865 |
| Manganese Chrome Antimony | Brown | " | — |
| Manganese Niobium Titanium | Brown | " | — |
| Chrome Tin | Pink | Sphene | 77301 |
| Cobalt Aluminate | Blue | Spinel | 77346 |
| Cobalt Tin | Blue-Gray | " | 77368 |
| Cobalt Zinc Aluminate | Blue | " | 77347 |
| Cobalt Chromite | Blue-Green | " | 77343 |
| Cobalt Chromite | Green | Spinel | 77344 |
| Chrome Alumina | Pink | " | 77290 |
| Iron Chromite | Brown | " | 77501 |
| Nickel Ferrite | Brown | " | 77497 |
| Zinc Ferrite | Brown | " | 77496 |
| Zinc Iron Chromite | Brown | " | 77503 |
| Copper Chromite | Black | " | 77428 |
| Iron Cobalt | Black | " | 77498 |
| Iron Cobalt Chromite | Black | " | 77502 |
| Chrome Iron Manganese | Brown | Spinel | — |
| Cobalt Tin Alumina | Blue | " | — |
| Chrome Iron Nickel | Black | " | — |
| Chrome Manganese Zinc | Brown | " | — |
| Zirconium Vanadium | Blue | Zircon | 77998 |
| Zirconium Praseodymium | Yellow | " | 77997 |
| Zirconium Iron | Pink | " | 77996 |

These glaze stains are also referred to as "porcelain enamel oxides" and/or "ceramic stains". The ceramic pigments or stains are usually quite large and are characterized as having an average particle size of about 2.5 to about 8 microns.

Frit refers to a pre-fired and ground mixture of several oxides such as $SiO_2$, $Al_2O_3$, $B_2O_3$, $ZrO_2$, $Na_2O$, $K_2O$, $PbO$, and $CaO$. Table II contains the empirical formula of three of the frits that are suitable for use in practicing the teachings of the present invention.

TABLE II

| | $K_2O$ | $Na_2O$ | $CaO$ | $ZnO$ | $PbO$ | $Al_2O_3$ | $B_2O_3$ | $SiO_2$ | $CaF_2$ |
|---|---|---|---|---|---|---|---|---|---|
| Frit A | — | .32 | .68 | — | — | — | .64 | 1.47 | — |

TABLE II-continued

| | $K_2O$ | $Na_2O$ | CaO | ZnO | PbO | $Al_2O_3$ | $B_2O_3$ | $SiO_2$ | $CaF_2$ |
| --- | --- | --- | --- | --- | --- | --- | --- | --- | --- |
| Frit B | .21 | .73 | .02 | .04 | — | .37 | .76 | 2.64 | .06 |
| Frit C | .02 | .29 | .69 | — | — | .27 | .57 | 2.49 | — |

Glaze refers to a mixture of frit, and several other inorganic components such as china clay, feldspar, silica and kaolin. Table III shows typical white or clear glazes that can be used in the teachings of the present invention. Before firing, the glaze is referred to as a raw glaze.

TABLE III

| Glaze<br>Firing Temperature<br>Type | A<br>1080° C.<br>Cr—Al | B<br>1080° C.<br>General | C<br>1080° C.<br>Zincless | D<br>1225° C.<br>Sanitary Ware |
| --- | --- | --- | --- | --- |
| Feldspar | 36 | 45 | — | 36 |
| Silica | 11 | — | 9.5 | 31 |
| Kaolin | — | 5 | 3.5 | 12 |
| China Clay | 6 | — | — | — |
| Talc | — | — | — | 7 |
| Whiting | 4 | 3 | 7.5 | 14 |
| Barium Carbonate | 4 | — | 3.5 | — |
| Wollastonite | — | 12 | — | — |
| Nepheline Syenite | — | — | 34 | — |
| White Lead | — | — | 19 | — |
| Zinc Oxide | 11 | 11 | — | — |
| Alumina Hydrate | 5 | — | — | — |
| Frit A | 23 | — | — | — |
| Frit B | — | 24 | — | — |
| Frit C | — | — | 23 | — |

A Slip is a suspension of a glaze in a vehicle such as water or alcohol. The consistency of the slip is determined by the manner in which the glaze is to be applied to the substrate. For example, a slip useful for spraying will be more dilute than one in which the substrate is to be dipped or from which the glaze is to be screened onto the surface.

The present invention relates to an improved method of coloring a raw glaze with a glaze stain whereby the step of ball-milling to achieve a uniform distribution of the stain through the glaze is eliminated. The invention relates to a novel dispersion of a glaze stain which includes the following components:

Pigment(s)—20–70%, preferably 60–65%
Suspending agent—1–3%, preferably about 2%
Thickening agent—up to about 1.5%
Organic dispersing agent—up to about 1%

As previously mentioned, a representative sample of pigments, also referred to as glaze stains, useful in the teachings of the present invention, are described in Table I.

The suspending agent serves to improve the stability and the flowability of the dispersion, and also permits a higher percentage of suspended solids to be incorporated into the dispersion. The suspending agent used in glaze stain of this invention may be attapulgite clay or a water-swellable smectite clay. A compatible mixture of an organic gum and attapulgite or a water-swellable smectite clay also has been found to be beneficial for this purpose. The ratio of the gum to the clay typically is in the range of 1:1 to 1:9.

The gum enhances the suspending power of the clay and improves the flowability of the slurry. For compatibility, an organic, anionic gum such as a carboxymethylated guar gum is preferred. The attapulgite or water-swellable smectite clay serves to improve the consistency of the gum while upgrading spreadability and texture. The gum has properties which enhance its ability to disperse in clay systems and to withstand adsorption on the clay.

The water-swellable smectite clays are typically naturally occurring or are derived from naturally occurring smectite clay. Where sodium or lithium is the predominant exchangeable ion, smectite clays have a high swelling capacity regardless of species. Smectite clays containing exchangeable calcium and magnesium when fully hydrated will swell but not as much as the sodium smectites. Water-swellable smectite clays for the purpose of this invention are defined as those which are capable of adsorbing water between the layers of the clay structure resulting in an increase in the distance between the layers and swelling of the clay. Attapulgite clay is also useful as a suspending agent in this invention because of its ability to absorb water. Attapulgite is useful particularly with ceramic pigments having a wide particle size distribution. In some embodiments, the use of attapulgite may require the use of additional amounts of thickener compared to the smectite clays. Particular examples of useful water-swellable smectite clays are sodium montmorillonite, magnesium saponite and magnesium-lithium hectorite.

Ca-Mg smectites can be converted to the more water-swellable sodium smectites by mixing soda ash (sodium carbonate) with crude, moist clay using various mechanical methods. After the soda ash is added, the clay generally is stockpiled for several days or weeks to permit maximum exchange to occur.

One particularly suitable clay is a product that is marketed by R.T. Vanderbilt, Inc., Norwalk, Ct., ° - under the trade designation VEEGUM ® in the form of insoluble flakes of colloidal magnesium aluminum silicate refined from natural smectite clay. It disperses easily and hydrates rapidly in water without the need for heat and high shear. Complete hydration is visually evident when the clay forms an even film on a spatula that is dipped into and withdrawn from the clay dispersion.

The water-swellable clay is typically used in the glaze stains of the invention at a level of from about 0.5 to about 3%. In most embodiments the glaze stains contain about 0.5% to 2.0%.

As its name suggests, the dispersant ensures that the pigment is uniformly dispersed throughout the aqueous medium and that the color dispersion when added to the ball-milled frit will be homogeneously dispersed without difficulty. Any of the dispersants such as the soluble salts of medium molecular weight polymethacrylic acids which are normally used for ceramic slurries are useful in the preparation of the color dispersion of the present invention. Up to 1% of the dispersant may be needed to disperse pigments such as a zirconium vanadium blue which has a relatively low specific gravity of 4.6 and small particle size, whereas no dispersant may be needed in a zirconium vanadium yellow which has a high specific gravity of 6.0 and a larger particle size. The addition of too much dispersant may cause the clay to disperse, thereby reducing the ability of the clay to serve as a suspending agent.

A small amount of a naturally occurring or synthetic water-soluble polymer gum often is added to the pigment dispersion as a thickener. The polymer gum is easily dispersed in water where it readily hydrates, causing a rapid rise in viscosity. When xanthan gum is used, it is added in an amount of approximately 0.001% to 1.5%, depending on the viscosity that is desired. Other thickeners that can be used in an amount up to 1.5% in carrying out the teachings of the present invention are water-soluble gums such as alginates, gum arabic and gum tragacanth. Modified cellulose ether gums such as hydroxy cellulose, methyl cellulose, hydroxy propylmethyl cellulose and sodium carboxymethyl cellulose may be used. Also useful are synthetic polymers such as Carbopol (a high molecular weight acrylic acid polymer) and polyvinyl pyrrolidone. Because of a greater tendency of these synthetic polymers to cause undesirable gelling of the dispersion, they are less preferred than the gums. The optimum levels of these thickeners in the slurries can be readily determined by routine experimentation.

At lower pigment loadings, the amount of thickener should be increased to maintain the same viscosity level. Generally, as the pH of the slurry increases, the slurry becomes thicker thereby reducing the amount of thickener that is required.

The following examples are presented for the purpose of clearly illustrating the teaching of the present invention. Unless otherwise indicated in the following examples and elsewhere in the specification and claims, all parts and percentages are by weight, temperatures are in degrees centigrade, and pressures are at or near atmospheric.

Examples 1-3

A pigment dispersion was prepared by making three stable premixes as follows:

Premix A was prepared by mixing 8 parts by co weight of a refined smectite clay (VEEGUM D ®) with 92 parts of water until the clay was fully hydrated.

Premix B was prepared by mixing 1 part of a modified anionic guar gum stabilizer and 0.1 part of an amine biocide into 99 parts of water.

Premix C was prepared from an aqueous mixture of 0.5% of a xanthan gum thickener, and 0.1% of an amine biocide.

The three premixes were blended together with mixed metal oxide pigment in the following amounts:

| | |
|---|---|
| Premix A | 33% |
| Premix B | 1% |
| Premix C | 1% |
| Pigment | 65% |

Up to 0.05% of an anionic surfactant was added as a dispersing agent, and the final alkalinity was adjusted with ammonia to a pH of between about 7 and about 9. The components were blended together in a mixer using a single or multiple-bladed agitator followed by a short period of intensive mixing to form a stable color dispersion. The concentration of the components in the blend, on a weight basis, was

| | |
|---|---|
| smectite clay | 2.64% |
| guar gum | 0.01% |
| xanthan gum | 0.008% |
| pigment | about 65% |
| dispersant | 0.01-0.05% |
| water | about 32-33% |

It should be noted that the color dispersion also can be prepared by blending the dry pigment with Premix A followed by direct addition of the active components of the other premixes, as long as adequate mixing occurs. Optimized performance of the thickener and stabilizer components is gained through the use of premixes.

A low temperature raw glaze was prepared by blending 100 parts by weight of water to 100 parts dry glaze B described in Table III, and 10 parts zirconium silicate. A small amount of magnesium sulfate was added and the glaze was ball-milled for 2 hours in a laboratory mill using ½" ceramic balls. The above prepared color dispersion was mixed with the raw glaze in a ratio that gave the percentage of color shown in Table IV. The blend was subjected to high shear in a Cowles mixer at moderate (1500 rpm) speed for 5 minutes to break up all agglomerates. The colored glaze was aprayed on to a 2"×4" wall tile which was then fired by heating for 5 hours to reach a temperature of 1080° C. and holding at that temperature for one-half hour. For comparison, ceramic tiles were prepared according to the teachings of the prior art. The comparison tiles were prepared by blending the same amount of pigment into the raw glaze on the ball mill, followed by spraying and firing.

For each example, the color of the tiles prepared by the present invention was measured against that of the prior art tile, using a Gardner Digital Color Difference Meter Model XL-10 using illuninant A (tungsten-halogen bulb). This instrument measures the L, a, b values of the colors according to the Hunter method where:

$$L = 100\, (Y/Y°)^{\frac{1}{2}}$$

$$a = \frac{Ka(X/Xo - Y/Yo)}{(Y/Yo)^{\frac{1}{2}}}$$

$$b = \frac{Kb(Y/Yo - Z/Zo)}{(Y/Yo)^{\frac{1}{2}}}$$

where X, Y, Z are tristimulus values, and X°, Y° and Z° are tristimulus values for a perfect diffuser.

For illuminant A, the following constant values are used:

$X° = 109.828$
$Y° = 100.000$
$Z° = 35.547$
$Ka = 185$

Kb = 38

L is called the lightness index whereas a and b are chromaticity indices. The value of L can range from L=0 for a black body to L=100 for a totally reflective body, thereby giving a measure of lightness/darkness. The value of a range from −a for total green to +a for total red. The value of b ranges from −b for blue to +b for yellow. The lightness/chromaticity index (Hunter) values for the various glazed tiles are shown on Table IV.

The Hunter values typically show that the ceramic glazes prepared according to the teachings of the present invention have lower L values, meaning that the colors are more intense. Furthermore the increase in the b value for yellow shows that the color strength is greater, equivalent to about 1% increase of strength for each 0.1 increase in b value. For the zirconium vanadium blues, the glazes prepared according to the teachings of the prior art have a lower b value, thus showing a greater strength of the blue color.

| Example | Ceramic Color | Preparation | % color in glaze | Hunter Values L | a | b |
| --- | --- | --- | --- | --- | --- | --- |
| 1 a | Zirconium Vanadium Yellow | Dry (Prior Art) | 5% | 81.1 | −3.2 | +26.6 |
| 1 b | " | Dispersion | 5% | 78.0 | −1.2 | +27.7 |
|  |  |  |  | Δ−3.1 | −2.0 | +1.1 |
| 2 a | Cobalt Nickel Grey | Dry (Prior Art) | 2% | 61.3 | −1.7 | −0.3 |
| 2 b | " | Dispersion | 2% | 59.3 | −1.8 | −0.5 |
|  |  |  |  | Δ−2.0 | +0.1 | −0.2 |
| 3 a | Zirconium Vanadium Blue (Zircon) | Dry (Prior Art) | 5% | 67.4 | −9.8 | −17.6 |
| 3 b | " | Dispersion | 5% | 66.6 | −9.7 | −19.0 |
|  |  |  |  | Δ−0.8 | +0.1 | −1.4 |

Although specific amounts of the three premixes and the pigment were used in these three examples, the percentages can range from 26% to 76% of Premix A, 0.5% to 2% of Premixes B and C and from about 20% up to about 70% of the dry pigment.

EXAMPLE 4

A pigment dispersion of zirconium vanadium blue was prepared by blending together three premixes prepared in accordance with the teachings of Examples 1-3. The dispersion was incorporated into the high temperature glaze D (see Table III). This glaze (100 parts), opacified with 10 parts of zirconium silicate, was milled with 100 parts water on a ball mill. The pigment was added as previously described, and 2"×4" tiles were prepared for firing by spraying them with .8 gm of the raw colored glaze. The tiles were then heated for 5 hours to 1225° C. and were held at that temperature for 3 hours followed by cooling. Hunter values were determined as before and are noted below.

TABLE V

| Example | Method of Preparation | Hunter Values L | a | b |
| --- | --- | --- | --- | --- |
| 4a | Dry | 58.5 | −10.1 | −21.7 |
| 4b | Dispersion | 56.4 | −10.2 | −22.5 |
|  |  | Δ−2.1 | −0.1 | −0.8 |

EXAMPLES 5-6

In the first four examples, the pigment dispersion was prepared by first making three separate premixes and then blending together these premixes followed by the slow addition of the pigment and dispersant. An alternative method is to prepare the dispersion by the addition of the pigment, dispersant and thickener in dry form to a fully hydrated clay slurry. By this method, ceramic stains were prepared from chrome tin pink and zirconium iron pink ceramic pigments as follows:

Smectite clay (VEEGUM D ®) was added to warm water until fully hydrated. Dry xanthan gum and guar gum were then added along with a preservative and the mixture was agitated for 20 minutes. The pigment was then added to give a final pigment composition of 65% pigment, 2.66% of the suspending agent comprising guar gum and clay, and 0.013% of xanthan gum. Up to 0.05% of a polymethacrylic acid dispersant was added as needed.

As in Examples 1-3, each dispersion was mixed with the glaze indicated (100 g water/100 g glaze/10 g zirconium silicate) and was sprayed onto a 2"×4" tile which was fired at 1080° C. The fired glaze was compared with a prior art glaze prepared from a raw glaze to which a dry pigment was added and blended by ball milling. Table VI shows the results of testing with the Gardner Instrument.

TABLE VI

| Example | Ceramic Color | Preparation | % color in glaze | Hunter Values L | a | b |
| --- | --- | --- | --- | --- | --- | --- |
| 5 a | Chrome Tin Pink (Glaze C) | Dry (Prior Art) | 6% | 37.6 | +24.3 | +6.0 |
| 5 b | " | Dispersion | 6% | 36.4 | +23.5 | +5.8 |
|  |  |  |  | Δ−1.2 | −0.8 | −0.2 |
| 6a | Zirconium Iron Pink (Zircon) (Glaze B) | Dry (Prior Art) | 5% | 59.5 | +17.4 | +12.3 |
| 6 b | " | Dispersion | 5% | 58.0 | +17.2 | +11.9 |
|  |  |  |  | Δ−1.5 | −0.2 | −0.4 |

In both instances, there is a measurable increase in intensity of these pink ceramic colors.

EXAMPLE 7

A blend of 10% cobalt aluminate blue ceramic and 90% zirconium vanadium blue zircon (1:9 ratio) is mixed with raw glaze C (Table III) to make three blends as follows:

Dry Blend A—a mixture of the two pigments ball-milled with the raw glaze per the prior art.

Dispersed Blend B—containing 60% pigment and prepared by incorporating dry pigments in the aforementioned ratio into a dispersion prepared from premixes as described in Examples 1-5.

Dispersed Blend C—prepared by forming a 60% dispersion of the cobalt aluminate blue by the method of Examples 1-5, forming a separate 60% dispersion of zirconium vanadium blue by the same method, and blending the dispersions in the ratio 1:9 with the raw glaze.

The dry blend and the two dispersions B and C were blended with the glaze to give a 5% total color. The glazes were fired at 1080° C. for the same length of time and after cooling, were compared with one another for color intensity and strength. The results are shown in the following table:

TABLE VII

| Sample | Method of Preparation | Hunter Values | | |
|---|---|---|---|---|
| | | L | a | b |
| 7a | Dry | 56.8 | −2.8 | −23.0 |
| 7b | Dispersion | 56.6 | −3.0 | −23.3 |
| 7c | Blend of Dispersions | 56.2 | −2.9 | −23.4 |

The lower values of L and b for Samples 7b and 7c as compared to 7a clearly reflect the greater strength and intensity of the blue color prepared from the color dispersions of this invention over the color prepared by the dry blend according to the prior art. It can be seen that more than one ceramic pigment may be combined together to produce dispersions having a wide variety of color shades. Each pigment is ball-milled or processed to develop the optimum color strength. Then the pigments may be dry blended together after which they are formed into a stable dispersion. Alternatively, each pigment can be formed into a dispersion, and then the dispersions may be blended together to form the desired color. By eliminating the step of ball-milling the pigments with the glaze, the properties of each pigment are optimized, and the degree of color intensity that is desired can be achieved with smaller amounts of pigment.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for forming a dispersion of an inorganic refractory mixed metal oxide ceramic pigment comprising blending together the following components:
   (A) between about 20% and 70% by weight of the mixed metal oxide inorganic pigment having a specific gravity of from about 4 to about 6.5 and an average particle size of from about 2.5 to about 8 microns.
   (B) between about 1% and about 3% of a suspending agent comprising attapulgite clay or a water-swellable smectite clay,
   (C) up to about 1% of an organic dispersing agent,
   (D) up to about 1.5% of a thickening agent, and
   (E) the remainder being water.

2. The process of claim 1 wherein the suspending agent comprises a water-swellable smectite clay.

3. The process of claim 1 wherein the attapulgite clay or the water-swellable clay is substantially fully hydrated with water before it is blended with the pigment.

4. The process of claim 3 wherein the suspending agent also includes a stabilizer comprising a guar gum.

5. The process of claim 1 wherein the thickening agent comprises a xanthan gum.

6. The process of claim 1 wherein the organic dispersing agent comprises an anionic surfactant.

7. The process of claim 1 wherein the inorganic pigment is present in the dispersion in an amount of between about 60% and about 65% by weight.

8. The process of claim 1 wherein:
   (A) the suspending agent is mixed with sufficient water to hydrate the clay,
   (B) the thickening agent is mixed with water in an amount of about 1 part per 100 parts of water,
   (C) about 1 part of a stabilizer is mixed with 100 parts of water,
   (D) the suspending agent, the thickening agent and the stabilizer are combined with a mixed metal oxide pigment and an opacifier in amounts required to produce the dispersion, and
   (E) the alkalinity of the dispersion is adjusted to a pH of between about 7 and about 9.

9. The process of claim 8 wherein an effective amount of an anionic organic surfactant is added as a dispersant prior to the final pH adjustment.

10. The process according to claim 8 wherein the thickening agent comprises a xanthan gum and the stabilizer comprises a guar gum.

11. The process according to claim 8 wherein the components are mixed together in the following amounts by weight:

| Hydrated suspending agent | 26–76% |
|---|---|
| Thickening agent | ½–2% |
| Stabilizer in water | ½–2% |
| Pigment | 20–70%. |

12. The process of claim 3 wherein the pigment, the dispersing agent and the thickening agent are added as dry ingredients to the fully hydrated clay.

13. The process of claim 12 wherein the suspending agent includes a guar gum stabilizer.

14. The process of claim 13 wherein the thickening agent comprises a xanthan gum.

15. The process of claim 14 wherein the dispersing agent comprises an anionic surfactant.

16. A stable aqueous color dispersion comprising a homogeneous blend, based on 100 parts by weight of dispersion, of
   (A) between about 20 and about 70 parts of an inorganic refractory mixed metal oxide pigment in finely divided form and characterized as having a specific gravity of from about 4 to about 6.5, and an average particle size of from about 2.5 to about 8 microns, (B) between about 1 part and about 3 parts of a suspending agent comprising attapulgite clay or a water-swellable smectite clay,
(C) up to about 1.5 parts of a thickening agent,
(D) from 0 to about 1 part of an organic dispersing agent, and
(E) the remainder being water.

17. The dispersion of claim 16 wherein the inorganic pigment is present in an amount of between about 60 and about 65 parts.

18. The dispersion of claim 16 wherein the suspending agent contains a water-swellable smectite clay.

19. The dispersion of claim 18 wherein the water-swellable smectite clay is present in an amount of about 2 parts per 100 parts of dispersion.

20. The dispersion of claim 19 wherein the suspending agent contains a modified guar gum.

21. The dispersion of claim 16 wherein the organic dispersing agent consists of an anionic surfactant.

22. The dispersion of claim 16 wherein the thickening agent comprises a modified xanthan gum.

23. The dispersion of claim 22 wherein the inorganic pigment is a zirconium-vanadium yellow.

24. A ceramic slip which before firing comprises a mixture of between about 0.1% and about 20% by weight of the color dispersion of claim 15 and from about 80% and about 99.9% by weight of a ball-milled raw glaze, said mixture suspended in a vehicle.

25. The slip of claim 24 wherein the vehicle is water.

26. A process of creating a decorative ceramic surface on a refractory body comprising:
(A) preparing a stable aqueous dispersion of an inorganic refractory mixed metal oxide ceramic pigment containing, based on 100 parts of dispersion:
(1) between about 20 and about 70 parts of an inorganic refractory mixed metal oxide pigment having a specific gravity of from about 4 to about 6.5, and an average particle size of from about 2.5 to about 8 microns,
(2) between about 1 part and about 3 parts of a suspending agent comprising attapulgite clay or a water-swellable smectite clay,
(3) up to about 1.5 parts of a thickening agent,
(4) from 0 to about 1 part of an organic dispersing agent; and
(5) the remainder being water,
(B) preparing a raw glaze for application to the refractory body by spraying, dipping or screening,
(C) blending between about 0.1% and about 20% by weight of the pigment dispersion with about 99.9% to about 80% of the raw glaze in a vehicle to form a slip,
(D) applying the slip to the surface of the refractory body to coat the surface,
(E) firing the coated surface to cause the glaze to melt and flow, and
(F) cooling the surface to harden the coating.

27. The process of claim 26 wherein the inorganic pigment is present in an amount of between about 60 and about 65 parts of the aqueous dispersion.

28. The process of claim 27 wherein the suspending agent contains a water-swellable smectite clay.

29. The process of claim 28 wherein the suspending agent also contains a modified guar gum stabilizer.

30. The process of claim 26 wherein the thickening agent is composed of a modified xanthan gum.

31. The process of claim 26 wherein the dispersing agent comprises an anionic surfactant.

32. The process of claim 26 wherein the pigment is a zirconium-vanadium yellow pigment.

33. The process of claim 26 wherein the coated surface is fired at a temperature of between about 1000° C. and 1300° C.

34. The process of claim 26 wherein the slip is subjected to intensive mixing following addition of the color dispersion thereto.

* * * * *